United States Patent
Tang et al.

(10) Patent No.: US 8,581,565 B2
(45) Date of Patent: Nov. 12, 2013

(54) DC-TO-DC CONVERTER HAVING SECONDARY-SIDE DIGITAL SENSING AND CONTROL

(75) Inventors: Zhao Tang, Zhejiang (CN); Jia Deng, Zhejiang (CN); Yuanping Zhou, Zhejiang (CN); Hongliang Lu, Zhejiang (CN); Mark Jutras, Upton, MA (US)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 2 days.

(21) Appl. No.: 13/453,534

(22) Filed: Apr. 23, 2012

(65) Prior Publication Data
US 2013/0188399 A1   Jul. 25, 2013

(30) Foreign Application Priority Data
Jan. 20, 2012   (CN) .......................... 2012 1 00193715

(51) Int. Cl.
*G05F 1/575*   (2006.01)
*H02M 1/36*   (2007.01)

(52) U.S. Cl.
USPC ............. 323/283; 323/238; 323/901; 363/49; 363/65

(58) Field of Classification Search
USPC ......... 323/225, 238, 271, 272, 283, 321, 901; 363/49, 65
See application file for complete search history.

(56) References Cited

U.S. PATENT DOCUMENTS

| | | | | |
|---|---|---|---|---|
| 6,009,000 A | * | 12/1999 | Siri | ............................ 363/21.09 |
| 8,237,423 B2 | * | 8/2012 | Heineman et al. | ............ 323/283 |
| 2004/0189251 A1 | * | 9/2004 | Kutkut et al. | .................. 320/128 |

* cited by examiner

*Primary Examiner* — Gary L Laxton
(74) *Attorney, Agent, or Firm* — BainwoodHuang

(57) ABSTRACT

A DC/DC converter for use in power supply applications employing multiple parallel-connected converters employs a digital controller referenced to the secondary or output side of an isolation boundary and having non-isolated direct connections to secondary side components. The controller directly monitors output voltage and output current and uses feedback control techniques to precisely control these values in a desired manner. The DC/DC converter can implement so-called "droop" current sharing with increased accuracy arising from the secondary-side digital control, so that a desired balanced sharing of current across multiple converters can be achieved. The converter uses calibration establish accurate set points, and any of a variety of additional functions/features to attain operational goals.

19 Claims, 8 Drawing Sheets

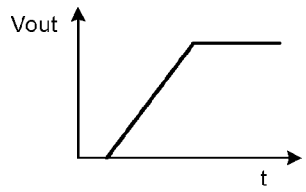 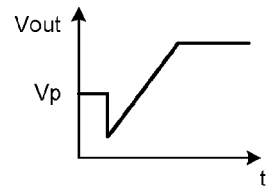 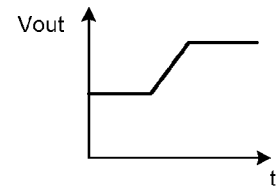
Fig. 10(a)  Fig. 10(b)  Fig. 10(c)
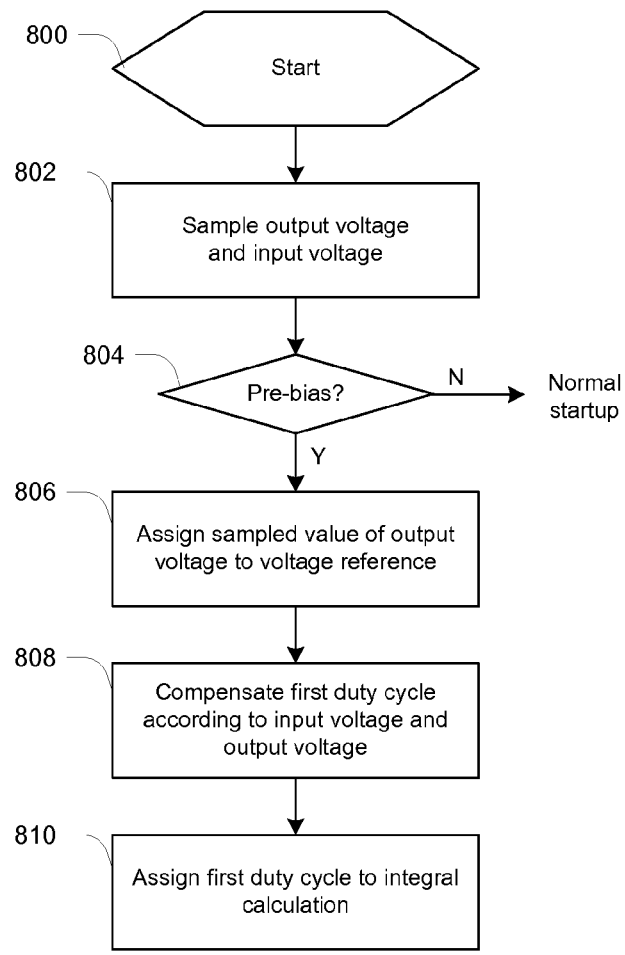
Fig. 11

DC-TO-DC CONVERTER HAVING SECONDARY-SIDE DIGITAL SENSING AND CONTROL

BACKGROUND

The invention relates to DC-to-DC power converters, also referred to as "DC/DC converters" herein.

A typical DC/DC converter converts a DC input voltage to a different (e.g., lower) DC output voltage. A DC/DC converter may be fully regulated, semi-regulated or non-regulated. If a DC/DC converter is regulated, its output voltage is compared to a reference voltage, and closed loop control maintains the output voltage at a stable value. If a DC/DC converter is semi-regulated, the output voltage is maintained in a small range according to the input voltage or applied load. If a DC/DC converter is non-regulated, the output voltage is a fixed ratio of the input voltage.

Closed loop control of DC/DC converters is commonly realized by an analog controller. The output voltage is scaled and the result is compared to a reference voltage, and analog circuitry compensates the closed loop. Analog closed loop control is simple and mature. However, any given implementation may be relatively inflexible (difficult to change or tune to meet operating goals) and may require a number of discrete components that consume system resources such as circuit board space.

SUMMARY

A DC/DC converter is disclosed having features for greater accuracy as well as to support power supply applications employing multiple parallel-connected converters. One major element is use of secondary-side digital control, i.e., a digital controller referenced to the secondary or output side of an isolation boundary and having non-isolated direct connections to secondary side components. This can provide certain benefits of digital control along with greater accuracy in sensing output voltage and current, for example, enabling more accurate regulation. In particular, the controller can directly monitor output voltage and output current and use feedback control techniques to precisely control these values in a desired manner. The DC/DC converter can implement so-called "droop" current sharing, a technique that has the advantage of simplicity but typically suffers from relatively poor accuracy. By the use of secondary-side digital control, accuracy is increased and thus a desired balanced sharing of current across multiple converters can be achieved.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIGS. 10(a), 10(b), and 10(c) are plots of output voltage during startup;

FIG. 11 is a flow diagram depicting pre-bias startup;

DETAILED DESCRIPTION

Figure 1:
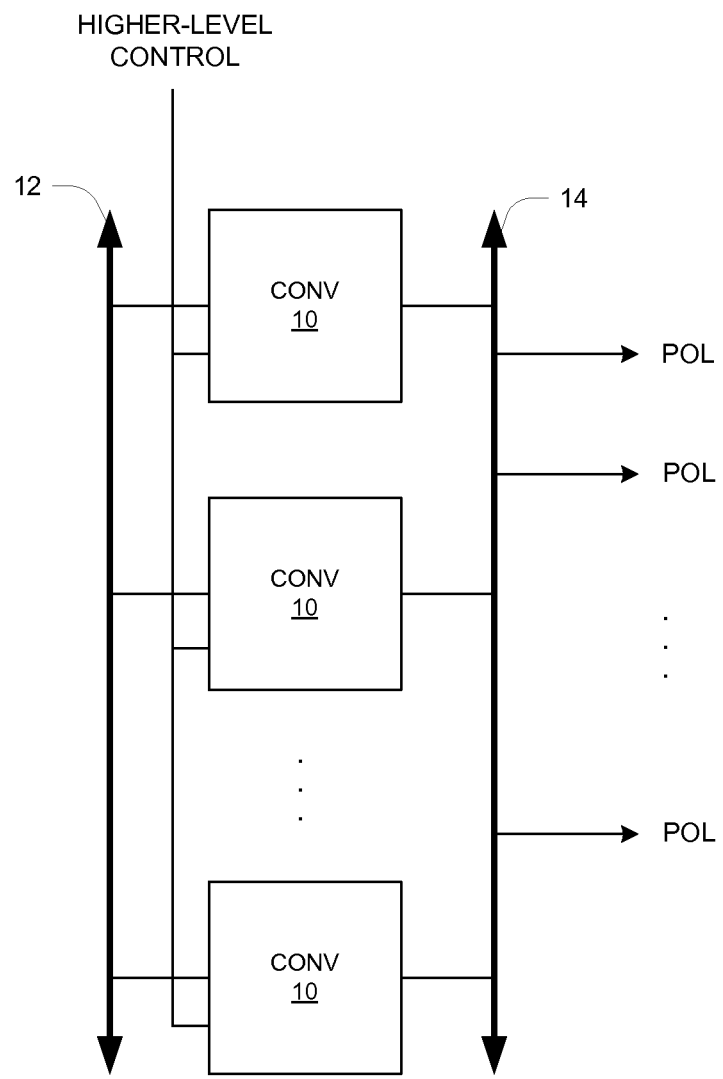
FIG. 1 is a block diagram of a power supply system employing multiple parallel-connected DC/DC converters.

FIG. 1 shows a power supply system having a set of DC/DC converters 10 arranged in parallel between an input power bus 12 and an output power bus 14. In a typical case, the voltage at the input power bus 12 ("input voltage") is higher than that of the output power bus 14 ("output voltage"). Power from output bus 14 is supplied to a set of point-of-load regulators (POLs) that provide power to local loads. In this kind of application the output power bus 14 may be referred to as an "intermediate" bus, because its voltage is typically in between a relatively high input voltage and lower voltages generated by the POLs. The converters 10 may be under the control of a higher level system power controller (higher level control, not shown in FIG. 1).

It is desirable to use parallel-connected sets of DC/DC converters 10 when the power required by an electric/electronic system is more than one DC/DC converter 10 can supply. In this configuration, the output voltages of the converters 10 are all inherently the same and equal to the output voltage appearing on the output bus 14. Load current is provided in a shared manner by the converters 10. As a simple example, if there are five identical converters 10 and the load current is 50 amperes (amps), then ideally each converter 10 provides 10 amps.

It is necessary to provide current-sharing control in systems using parallel DC/DC converters to ensure that load current and heat are evenly distributed and to prevent one or more of the converters from becoming overloaded. There are many current sharing methods including master-slave current-programming with dedicated master, average current-programming with automatic master control, and maximum current-programming with automatic master control and external control. As indicated above, the current sharing scheme supported by the presently disclosed converter 10 is the so-called "droop" method, so named because of the use of a downward-sloping characteristic of the converter output as explained below.

Figure 2:
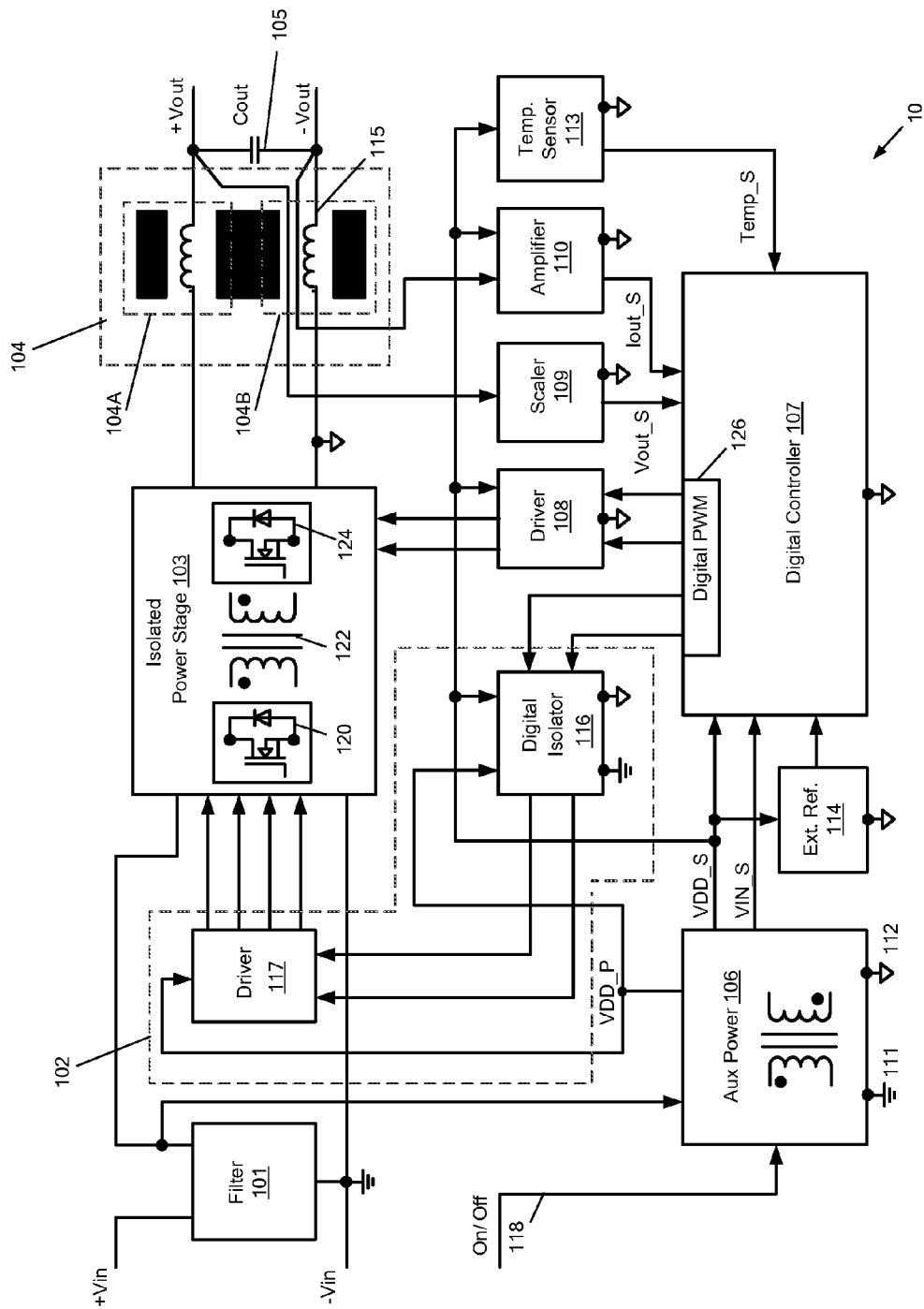
FIG. 2 is a schematic diagram of a DC/DC converter.

FIG. 2 shows a digital DC/DC converter 10, which includes an input filter inductor 101, an isolated drive circuit 102, an isolated power stage 103, an output filter inductor 104 having a winding 115 for measuring DC voltage drop, an output filter capacitor 105, auxiliary power circuitry 106, a digital controller 107, a secondary-side synchronous driver 108, an output voltage scaler 109, a current signal amplifier 110, and a temperature sensor 113. An input voltage is shown as Vin, and pin 118 is an input for receiving an ON/OFF control input. The ON/OFF pin 118 is connected to the auxiliary power circuit 106 to control auxiliary power.

The positive port of Vin is connected to auxiliary power circuit 106 and isolated power stage 103 through the input filter 101. The negative port of Vin is a primary-side ground 111, which is distinct and DC-isolated from a secondary-side ground 112. These grounds are shown using two different symbols in FIGS. 2 and 3.

The auxiliary power circuitry 106 may be implemented as a flyback converter with several outputs. The primary-side circuits are powered by a non-isolated power output VDD_P, and secondary-side circuits are powered by an isolated power output VDD_S. An additional isolated output Vin_S is proportional to the input voltage Vin and used for sensing purposes by the digital controller 107.

The isolated power stage 103 includes primary-side MOSFETs 120, a transformer 122, and secondary-side synchronous MOSFETs 124. The output of the isolated power stage 103 is filtered by the output filter inductor 104 and output filter capacitor 105 to generate a DC output voltage Vout.

The output filter inductor 104 is composed of filter inductor 104A and filter inductor 104B. Filter inductor 104A is in series between the isolated power stage 103 and the positive port +Vout of the output voltage Vout, while the filter inductor 104B is in series between the isolated power stage 103 and the negative port −Vout of the output voltage Vout. The connecting point of the filter inductor 104B and isolated power stage 103 is grounded to the secondary-side ground 112. The DC output voltage Vout is scaled by the scaler 109 to form an output voltage sense signal Vout_S used by the digital controller 107 for output voltage sensing. The scaler 109 may be implemented as a divider, for example. The output of the DC voltage drop measuring winding 115 of the output filter inductor 104 is amplified by the amplifier 110 to generate an output current sense signal Iout_S used by the digital controller 107 for output current sensing.

The temperature sensor 113 senses the temperature of output filter inductor 104 and converter, and it outputs temperature signal Temp_S.

The digital controller 107 uses the various sense inputs (VDD_S, etc.) to obtain samples of Vin, Vout, Iout, temperature and auxiliary power voltage. These sampled signals are processed by firmware routines executing within the digital controller 107 to generate digital PWM signals 126 to achieve desired operation. In particular, the digital PWM signals 126 are provided to the isolated drive circuit 102, which includes digital isolator 116 and driver 117, and to the secondary-side synchronous driver 108 of isolated power stage 103, to drive corresponding internal MOSFETs (120, 124) of the isolated power stage 103. In some embodiments the digital controller 107 may be implemented by a digital signal processor.

In some embodiments, the digital controller 107 may have an internal reference circuit used to generate a reference signal for control routines. In the illustrated embodiment, an external reference 114 is used which may have higher accuracy than an internal reference, enabling the converter to achieve greater accuracy of the output voltage Vout in operation.

Figure 3:
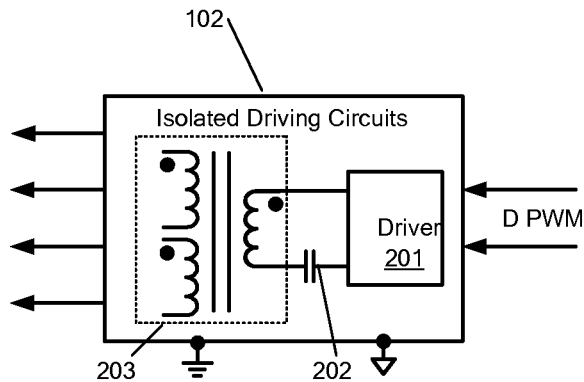
FIGS. 3 and 4 are schematic diagrams of functional sections of a DC/DC converter.

FIG. 3 shows that the isolated drive circuit 102 includes a driver amplifier 201, a capacitor 202 and an isolated transformer 203.

Figure 4:
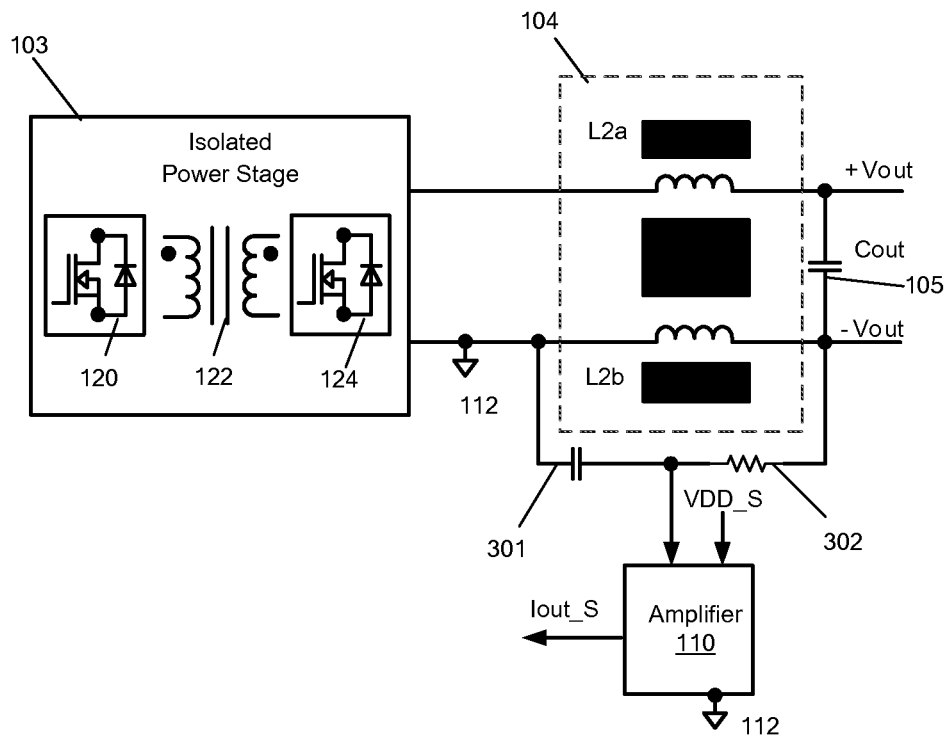

FIG. 4 shows that the current of the output filter inductor 104 may be sensed by an RC filter including capacitor 301 and resistor 302.

Returning to FIG. 2, it is noted that the digital controller 107 is connected to the secondary-side ground 112. This arrangement is referred to as "secondary-side control". Some conventional digital regulated converters employ primary-side control in which the control circuitry is connected to a primary-side ground. In this case, any control signals for secondary-side components must pass through isolating elements such as opto-couplers in order to maintain isolation between the primary and secondary sides. Opto-couplers tend to suffer from low reliability and poor dynamic response. Thus, the illustrated arrangement employing secondary-side control can exhibit improved reliability and dynamic response over such conventional converters using primary-side control. Also, operating parameters (i.e., proportional-integral-derivative or PID parameters) can be updated according to operating state for best output characteristic by the digital regulated converter with secondary-side control. Also, nonlinear control could be adopted for good dynamic response.

As indicated above, the converter 10 may be under the control of a higher level system controller, in which case the converter 10 will also include a communications interface to such separate controller. Examples of such a communications interface include I2C, SPI and UART.

As indicated above, current sharing is achieved using the droop current-sharing method. This method for current-sharing is realized by establishing a slightly negative output impedance (ratio of output voltage to output current) for each converter. This is in contrast to the typical ideal output impedance of zero (converter maintains constant voltage over a range of current). In operation, the output voltage serves as a signaling mechanism for each converter to adjust its output current to effect a desired sharing.

Figure 5:
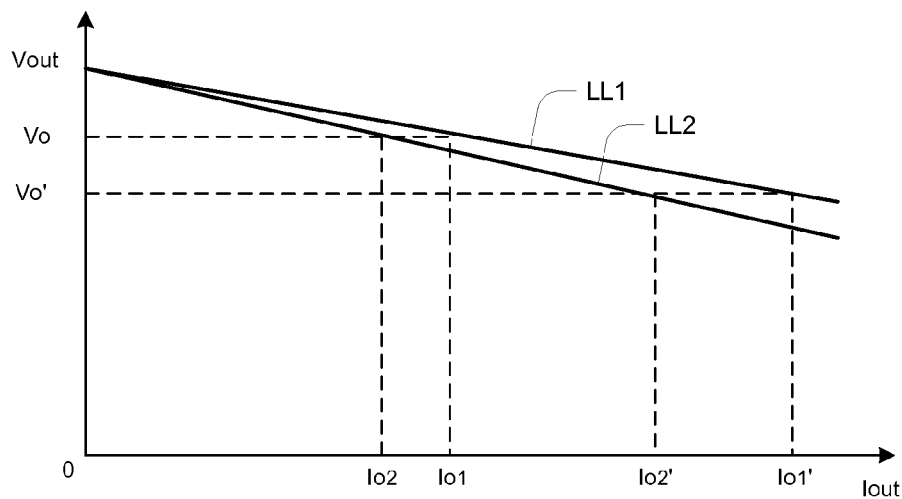
FIGS. 5 and 6 are plots of load lines.

FIG. 5 illustrates droop current sharing with reference to respective "load lines" LL1 and LL2 for two parallel converters, each load line being a plot of output voltage (Vout) versus output current (Iout) for the respective converter. The slope of the load line is the output impedance. At any given output voltage Vout, the total output current Iout is the sum of the output currents Io1 and Io2 of the individual converters. If the load lines were identical, then the current load would be shared equally between the two converters across a range of loads. FIG. 5 illustrates the more general case in which there is some degree of difference between the two load lines LL1 and LL2. It can be seen that under a first operating condition with a total output current (load current) of Io=Io1+Io2, there is a first output voltage Vo and the currents Io1 and Io2 are slightly unequal as shown. If the total output current increases to Io'=Io1'+Io2', the output voltage decreases to Vo' and the difference between the output currents of the two converters is even greater.

From the above explanation it will be appreciated that for equalized current sharing in a droop current sharing scheme, it is desired that the converters have load lines that are as identical as possible. Another way to say this is that the precision of current-sharing is guaranteed as there is good consistency of the output characteristic (output voltage with no load, sampling value of output current and droop slope).

Figure 6:
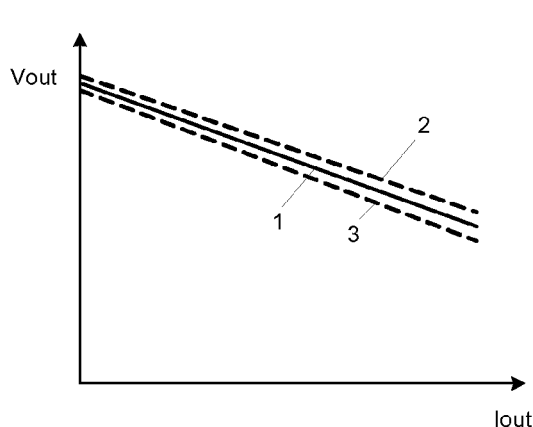

FIG. 6 shows the output characteristic of a single digital DC/DC converter, with a first line 1 being a typical or nominal characteristic while dashed lines 2, 3 represent tolerance limits for this characteristic. That is, a parallel-converter system may guarantee the precision of current sharing when the characteristic of each converter is located between the dashed lines 2, 3. In practice, it may be difficult or impossible to realize a desired output characteristic (i.e., within the lines 2, 3) for some converter types, in which case the precision of current sharing may not be guaranteed. For example, converters employing primary-side control may suffer certain inaccuracies due to the isolation boundary separating the control circuitry from the outputs, as briefly mentioned above.

The presently disclosed converter employs certain features to realize greater control and precision of the converter output characteristic (load line) and thus greater precision of droop current sharing in a parallel-converter application. One important aspect is secondary-side control, as it enables more direct and therefore accurate sensing of output voltage and output current, providing corresponding accuracy in establishing a desired output characteristic. Secondary-side sensing of output current is especially important for achieving greater accuracy. A calibration of output voltage versus sampled values of output current is also utilized. The output voltage and the sampling value of output current are measured, and the measured values are transferred to the digital controller 107 where they are used in calculations to make the output voltage, sampling value of output current and droop slope in tolerance according to a calibrated value. In particular, the calibration serves to compensate for variability in the sensors used to sense output voltage and output current, and for variability in the references used to establish desired operating points. The calibration value may be saved in internal non-volatile memory in the controller 107 to prevent it from being lost when operating power is not being supplied to the converter.

Figure 7:
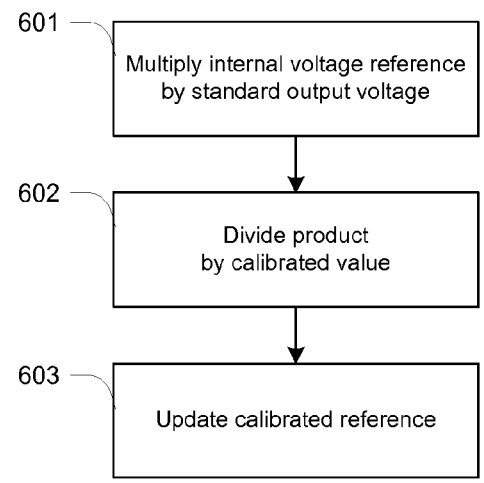
FIG. 7 is a flow diagram depicting a calibration operation.

FIG. 7 illustrates the calibration procedure. At 601, a voltage reference is multiplied by a standard output voltage. At 602, the product resulting from the multiplication is scaled by a stored calibrated value of voltage. At 603, the result of the scaling is used to update the stored calibrated value.

There is also a set of features pertaining to startup operation of the digital converter that provide advantages specifically in multi-converter applications. These features include soft start with a programmable output voltage profile; "constant current" startup; and "pre-bias" startup. Each of these is described in turn.

Figure 8A:
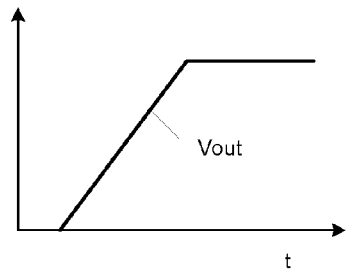
FIGS. 8(a) and 8(b) are plots of output voltage during startup.
Figure 8B:
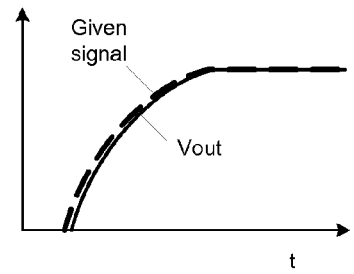

One feature employed in the converter 10 is referred to as "reference soft-start", used to achieve output voltage soft-start. A closed loop adjustment mechanism is working beginning with the very first PWM pulse during startup. Reference soft-start can implement monotonic and linear output voltage start-up, or it has the ability to track a certain given signal to start up in another way as might be desired. Linear start-up is shown in FIG. 8(*a*). In FIG. 8(*b*), the dashed line is the given signal, and the solid line is the output voltage. This figure shows that the output voltage can track the given signal in start-up.

Another feature is the use of constant current startup to address a certain problem that can occur during startup in multi-converter systems. A typical converter employs voltage control during startup, to bring the output voltage gradually from zero to its operating value. In a multiple-converter system, if one converter lags behind the others then one or more converters may source a very high current, potentially causing a shut down due to a perceived overload condition. Depending on the exact characteristics of the converters and the load, startup may become delayed and accompanied by undesirable transients, or it may fail completely. The disclosed converter employs a constant current limit during startup to avoid such operating conditions.

Figure 9:
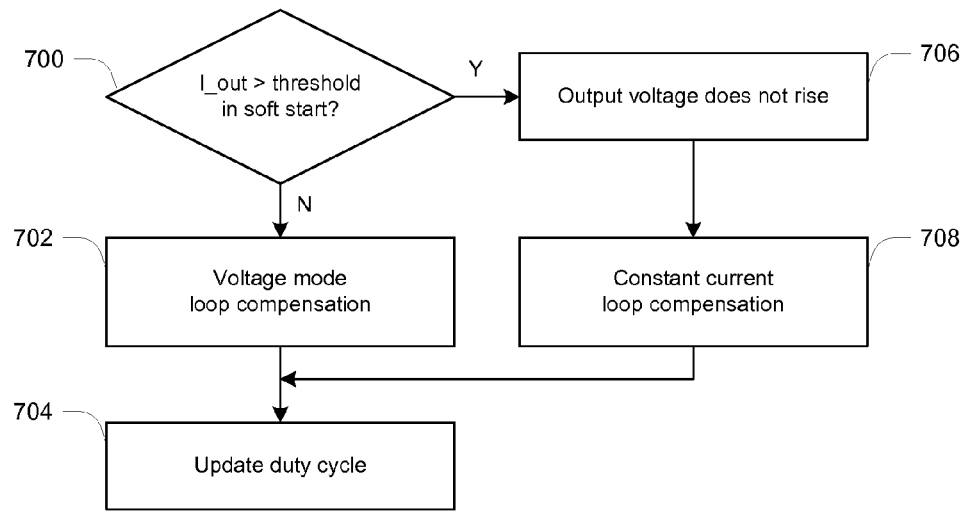
FIG. 9 is a flow diagram depicting constant-current startup.

FIG. 9 illustrates constant current startup. Startup begins using voltage mode control, and continues as long as the load (output current) stays below the constant current limit. More specifically, at 700 there is a test whether the output current I_out is greater than a predetermined current threshold (constant current limit) during soft start. If not, then at 702 voltage mode control (or loop compensation) is utilized, and at 704 the duty cycle of the digital PWM signals 126 is updated. If at 700 the output current I_out is determined to be greater than the predetermined current threshold, then at 706 the output voltage is prevented from rising further (a temporary measure), and at 708 control is switched to current mode control and the current output is maintained steady at the constant current value.

Another explanation for constant current startup is as follows. Output voltage is controlled by a voltage loop as the digital DC/DC converter 10 starts up with a normal load. Output voltage is controlled by a constant current loop as the digital DC/DC converter 10 starts up in over load. When the digital DC/DC converter 10 starts up in parallel, the output voltage of every digital DC/DC converter 10 rises gradually. If the output voltage of one digital DC/DC converter is higher than others, its output current is much larger than the others. When its output current reaches constant current threshold, its output current is limited at the threshold value. Meanwhile, its output voltage does not increase anymore and is constant, while the output voltage of other digital DC/DC converters 10 rises continuously. When the output voltage of the other digital DC/DC converters 10 is higher than the output voltage of the current-limited converter 10, its output current should now be lower than the constant current threshold, and thus it switches back to voltage loop control and its output voltage resumes rising continuously. The other digital DC/DC converters 10 with higher output voltage would switch to constant current control. Every digital DC/DC converter 10 in parallel switches back and forth between voltage loop control and constant current loop control in startup, and the circulating current is limited in a reasonable range. In this way, the startup of digital DC/DC converter in parallel with full load could be realized.

A feature referred to as "pre-bias startup" is now described, beginning with reference to FIGS. 10(*a*) through 10(*c*). These illustrate patterns of the output voltage Vout during initial operation of the converter. The pre-bias startup feature supports applications in which multiple converters are used in parallel to provide higher output power than is available from a single converter. In these applications, the outputs of the converters are connected together to a single output power bus having the voltage Vout. The pre-bias startup feature is implemented in each of one or more individual converters. Within an individual converter, the feature is based partly on sensing the output voltage Vout, which may be a non-zero value by action of another converter. The goal is to enable the converters to work smoothly together, avoiding undesired transients, overload conditions, etc.

FIG. 10(*a*) illustrates the ideal case, in which the output voltage Vout rises smoothly and monotonically from zero to its operating value. It is assumed that during the startup the parallel-connected converters are sharing the load current in a sufficiently balanced way.

FIG. 10(*b*) illustrates a case in which the output voltage Vout already has a non-zero value (by action of one or more converters) when another converter begins its startup. This is referred to as a "pre-bias" condition, and the non-zero initial output voltage is shown as a pre-bias output voltage Vp. FIG. 10(*b*) shows an undesirable startup in which the later startup of a converter causes a spike or irregularity on the output voltage. In some cases, this might be accompanied by an excessively high "circulating current" flowing between the respective outputs of the converters. It is actually possible that one or more converters may not be able to start up successfully due to a large circulating current, if it exceeds an over-current protection threshold.

FIG. 10(*c*) illustrates the desired output voltage transition when a pre-bias condition occurs. The output voltage proceeds smoothly from the pre-bias value Vp to the final operating value. This is achieved by the presently disclosed pre-bias startup technique as described below.

Referring to FIG. 11, at 800 the startup process is begun, and at 802 the digital controller 107 samples the input voltage and output voltage. At 804, the digital controller compares the output voltage to zero to determine whether there is a pre-bias condition. If not, then it proceeds to a normal (non-pre-bias)

soft-start process (not shown in FIG. 11). If so, then at 806 the sampled value of the output voltage is assigned to the voltage reference, meaning that this converter begins operating at the existing pre-bias voltage rather than at zero volts. At 808 the duty cycle required for the pre-bias voltage is calculated, and at 810 this duty cycle value is assigned to the "integral" part of a proportional-integral-derivative (PID) control scheme used by the digital controller 107.

Figure 12:
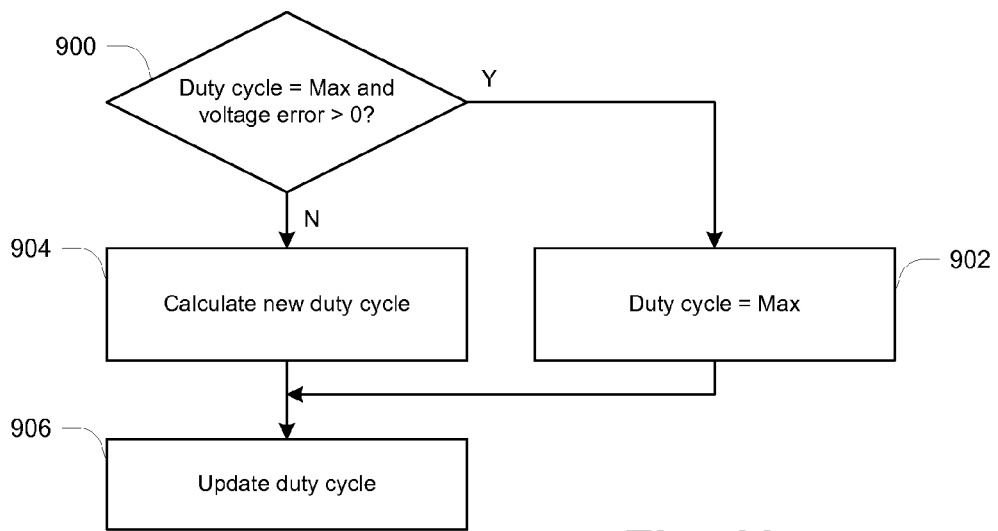
FIG. 12 is a flow diagram depicting duty cycle limiting.

FIG. 12 illustrates a feature of duty cycle limiting according to a predetermined maximum duty cycle value that may be chosen based on a variety of considerations. Generally, closed-loop regulation is used throughout the whole input voltage range. But if the input voltage becomes sufficiently low and the closed-loop compensator is saturated, the PWM signal may output at a maximum limit indefinitely. According to the disclosed technique, the converter is still working under closed-loop regulation even at this time. This feature can avoid the drawbacks of analog compensators (such as delay) when exiting the saturation, through the use of digital control.

In particular, at 900 a test is performed whether the duty cycle is equal to this maximum duty cycle value (Max) and there is positive non-zero voltage error. If so, then at 902 the duty cycle is maintained at the Max value, and at 906 the unchanged duty cycle value is used to update the actual operating duty cycle. Otherwise, at 904 the regular duty cycle calculation is performed, which generates a duty cycle in accordance with the PID control scheme to regulate the output voltage as desired. This calculated value is used to update the actual duty cycle at 906.

Figure 13:
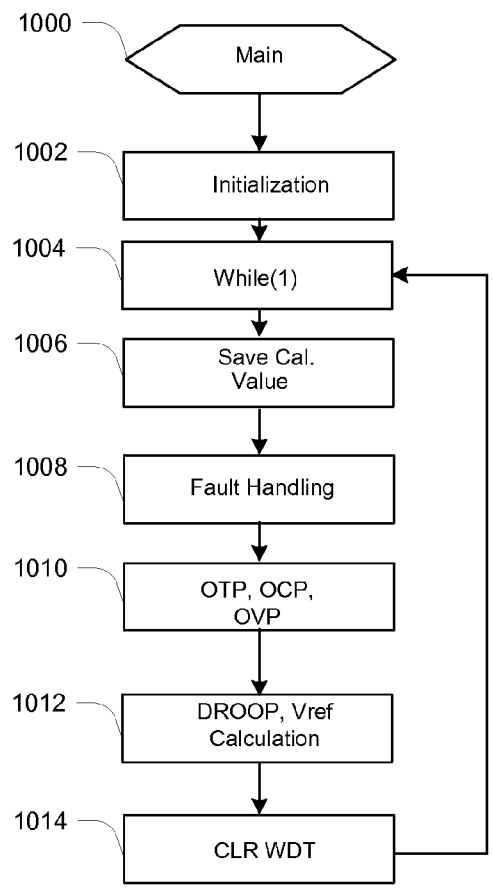
FIG. 13 is a flow diagram depicting a main loop of operation.

FIG. 13 illustrates a main loop of operation of the controller 107, as indicated at 1000. This sequence of operations occurs indefinitely. At 1002, initialization operations are performed. 1004 shows a While statement that controls looping. At 1006, calibration values are saved. 1008 represents the handling of fault conditions that might exist or occur during operation. 1010 represents over-temperature protection (OTP), over-voltage protection (OVP), and over-current protection (OCP). At 1012 the calculations for droop current sharing and reference voltage Vref are made. At 1014 a "clear" signal is asserted for a separate watch dog timer (WDT) that operates as a monitor. In normal operation, the clear signal is asserted each time through the loop and thus the WDT is prevented from counting to a terminal count. If the loop should not be performed for some reason (due to hardware malfunction, for example), the clear signal will not be asserted and the WDT will count to a terminal state, at which point it asserts some manner of alarm to alert an operator and/or service personnel, for example.

As explained above, droop current sharing can be realized by using a fixed duty cycle for given values of input voltage Vin and output voltage Vout. If Vout is maintained while Vin is allowed to vary over a range, it is necessary to change the fixed duty cycle as a function of Vin to maintain the same load line characteristic. Thus the fixed duty cycle is higher for lower values of Vin, and lower for higher values of Vin. However, efficiency can suffer if a duty cycle too low or too high is used. Also, operating at a fixed duty cycle might not allow for a precise set point at a given load condition, negatively affecting the accuracy of droop current sharing.

Figure 14:
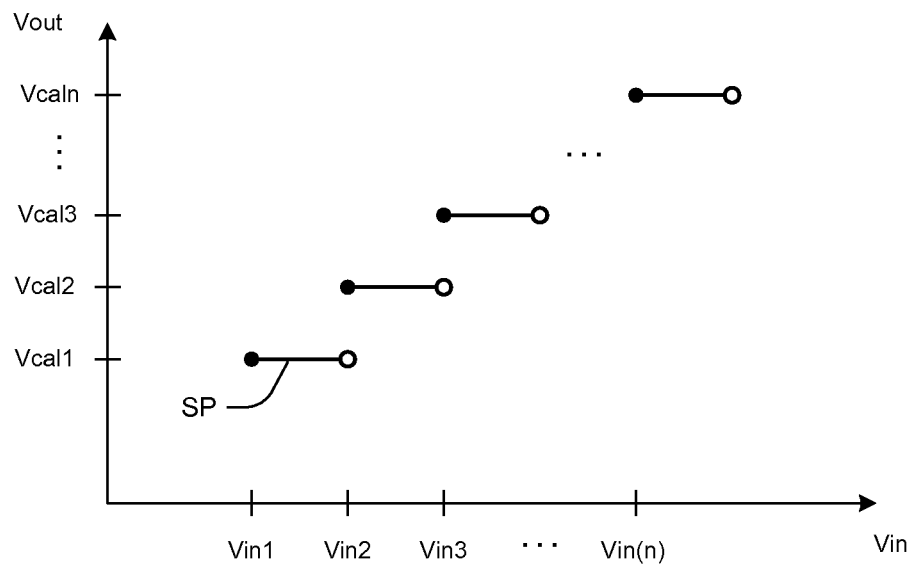
FIG. 14 is a plot of a set of output set points.

FIG. 14 depicts the use of different set points under different operating conditions, which can help maintain efficiency and accuracy across such operating conditions. Different set points SP establish different output voltages Vcalx for different ranges of the input voltage Vin. Such a set of calibrated output set points can be stored in a look up table. During operation, Vin is monitored by the digital controller 107 by way of a signal that varies proportional to Vin. Different set point values are retrieved from the table and used to control operation in the different ranges of input voltage Vin. The regulation set points are preferably selected such that the optimum duty cycle range is used in each input voltage range. This capability could be implemented as an optional mode of operation, usable to optimize efficiency.

FIG. 14 shows <n> samples of Vin that map to <n> values of calibrated output voltage set points, which could be picked from an array stored in a look up table. In theory a look up table may contain any number of desired set points. With a look up table the maximum quantity of stored set point values may be determined by one of the following: 1) The quantity of discrete integer values of sampled input voltage, based on the entire range of Vin and the number of bits of analog to digital conversion that can be used as pointers (look up table addresses) in the application, or 2) the amount of available non volatile memory that can be allocated to store the lookup values, or 3) the number of discrete points that are practical to calibrate in the manufacturing environment. The minimum number of set point values will be determined based on acceptable accuracy of parallel operation. With converters operating in parallel, the ADC results for the signal that is proportional to Vin should be identical across all converters. However, with quantization error as well as other tolerances, it is possible that different converters may interpret Vin with small differences. When Vin is at a value around one of the lookup table transition points, it is possible that different converters will point to different look up values. At these points, the converters experience a differential in their set points and thus the current sharing accuracy decreases by an amount related to the set point step size. So in this respect the minimum number of set point values will be determined by the desired current share accuracy that can be tolerated at the transition points. More set point values means that the set point step size is smaller and these error effects are less than they would be if fewer set point values are used. Over a typical input range, 32 or 64 set point values may be practical to implement and may suffice for droop current share accuracy. These are typical quantities that may be larger or smaller in various implementations.

Another method of providing similar functionality is to use an equation to define the set point value as a function of Vin. A graph of the equation could derived as the number of evenly spaced Vin points over the operating span approaches infinity or in a practical sense as it approaches the limit of available discrete ADC values over that span. In the example in FIG. 14, if the Vcal points and Vin samples are evenly spaced as the quantity of samples <n> approaches a large number, the equation would be that of a straight line y=mx+b. In this example, the slope m and the offset b could be picked to map the set points to Vin by means of a simple calculation. Both the slope and the offset could be calibrated values for best accuracy. However, there is no guarantee that the optimum set point values will map to an evenly spaced distribution, and the equation may not necessarily be that of a straight line or might not necessarily be a single continuous function. Thus this technique may involve a tradeoff of accuracy, as any equation that is used may only approximate the most desired set of set point values. Nonetheless, using a digital controller provides flexibility insofar as any of a multitude of equations could be used to calculate the set points. It should be noted that with a digital control approach the Vin values are sampled and digitized, and thus there will be a limited integer number of discrete Vin points than can be used. So even using an equation-based technique, the output characteristic will still be discrete in nature.

For accurate current sharing, it is important to have both a well calibrated set point at a specific load condition and a controlled and calibrated load line. The selection of different set points at different input voltages helps attain these goals, but only with accompanying changes in the output voltage Vout that serves as input voltage to the downstream POL regulators. The POL regulators will have a minimum operating input voltage specification. If the input voltage regulation set point of the converter 10 is lowered and the slope of the load line is not adjusted, then it would be possible that at low input voltage and high load, the Vout of the converters 10 would drop below the minimum specified input voltage of the POL regulators.

Figure 15:
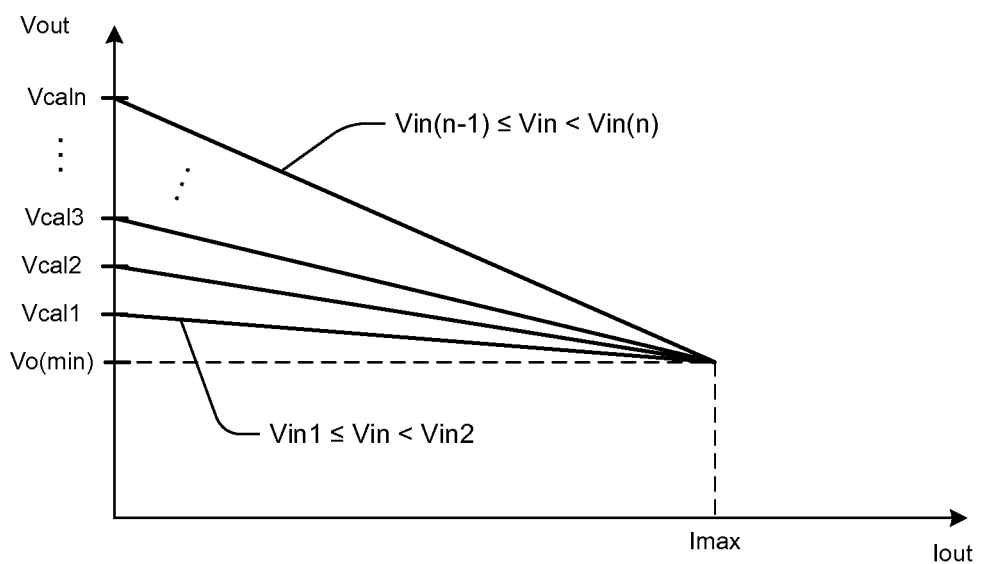
FIG. 15 is a plot of load lines.

FIG. 15 shows the use of different load lines for different values of Vcalx in order to avoid such an operational issue. Digital control is used to scale the load line slope as a function of the regulation set point. That is, the load line has a predetermined relatively low slope for a lowest range Vin1≤Vin<Vin2, and for Vin in successively higher ranges the load line slope increases correspondingly. This can be done in a manner that prevents the droop characteristic from moving Vout below a minimum desired value Vo(min) as long as the output current stays below a maximum value Imax.

In the above techniques it is assumed that the load lines are assumed to be linear, i.e., to be defined by a single slope value. While this characteristic may be preferred in many cases, it is not essential, and in fact it may be less than optimal in some circumstances. For example, when the output voltage is controlled to a narrow set of duty cycles at various input voltages as described above, it is possible that the droop current sharing accuracy can suffer when the droop slope becomes smaller. The smaller slope is equivalent to having a lower output impedance, meaning that greater set point calibration accuracy is required to accurately balance the load currents among the converters 10. This would be most noticeable at lower loads. Using linear load lines, it may be difficult to achieve a desired accuracy while maintaining desired characteristics across the entire broad range of operation.

Thus, an alternative is to use a technique referred to herein as "calibrated non-linear droop". Using this technique, each load line is generalized to a shape defined by a number of points, which enables the load line to deviate from a straight-line characteristic. The points are established by a calibration procedure to achieve a desired balance among several goals, including accurate current sharing, optimum efficiency, and sufficiently high Vout across a range of operating conditions. For example, a fixed load regulation set point could be calibrated at maximum load, guaranteeing that all converters 10 have near identical set points at full load independent of Vin. The desired load lines for each converter 10 are then generated from equations or a look up table as a function of Vin. The set points along the load line are optimized for current sharing accuracy across the extent of the load line. Different load lines for different ranges of Vin can be used as described above, so that the duty cycle is controlled over a desired narrow range.

While various embodiments of the invention have been particularly shown and described, it will be understood by those skilled in the art that various changes in form and details may be made therein without departing from the spirit and scope of the invention as defined by the appended claims.

What is claimed is:

1. A switching power converter usable as one of a set of current sharing power converters employing droop equalization of current sharing according to a droop load line, comprising:

power conversion circuitry having an isolated switching power stage driving a converter output based on a secondary-side switching control input;

interface circuitry configured to drive the secondary-side switching control input of the power conversion circuitry and to generate a stable reference signal and voltage and current sense signals, the secondary-side switching control input being driven based on a power stage control signal, the voltage and current sense signals being generated based on an output voltage and an output current respectively at the converter output; and a digital signal processor operative to execute instructions to perform a regulation method, the regulation method including:

applying respective voltage and current scaling factors to the voltage and current sense signals to generate respective scaled voltage and current sense values;

generating the power stage control signal with a duty cycle having a predetermined droop-regulation relationship with the stable reference signal and the scaled voltage and current sense values; and performing a calibration procedure to calculate the voltage and current scaling factors as values compensating for component tolerances in the interface circuitry and causing the power stage control signal to be generated to effect regulation of the output voltage and output current according to the droop load line.

2. A switching power converter according to claim 1, wherein the interface circuitry includes a measuring winding of an output filter inductor of the power conversion circuitry.

3. A switching power converter according to claim 1, wherein the interface circuitry further includes a resistor-capacitor filter circuit connected across the measuring winding to effect filtering of the current sense signal.

4. A switching power converter according to claim 1, wherein the isolated switching power stage has a primary-side power switch, a transformer coupling primary-side power to the secondary side, and a secondary-side power switch, the secondary-side power switch receiving a switch control signal.

5. A switching power converter according to claim 4, wherein the interface circuitry includes a non-isolated secondary-side driver and an isolated primary-side driver, the non-isolated secondary-side driver having an output coupled to the secondary-side power switch, the isolated primary-side driver having an output coupled to the primary-side power switch.

6. A switching power converter according to claim 5, wherein the isolated primary-side driver includes a driver amplifier and a signal transformer operative to couple an output of the driver amplifier to the primary-side power switch.

7. A switching power converter according to claim 1, wherein the regulation method includes a current limiting function during a startup mode of operation, the current limiting function limiting the output current to no more than a predetermined maximum startup current.

8. A switching power converter according to claim 1, wherein the regulation method includes a duty cycle limiting function limiting a duty cycle of operation to no more than a maximum predetermined duty cycle.

9. A switching power converter according to claim 1, wherein the regulation method further includes:

employing a set of distinct set point values each used for a respective distinct range of input voltage of the converter and establishing a corresponding distinct output voltage of the converter, the set point values chosen to control a duty cycle of the converter to be within a predetermined narrow range for relatively high efficiency operation over all the distinct ranges of input voltage of the converter.

10. A switching power converter according to claim 9, wherein employing the distinct set point values includes retrieving pre-calculated set point values from a look up table to control the duty cycle of the converter based on the value of the input voltage.

11. A switching power converter according to claim 9, wherein employing the distinct set point values includes evaluating a predetermined equation based on corresponding values of the input voltage.

12. A switching power converter according to claim 9, wherein the regulation method further includes:
  employing a set of distinctly sloped load lines in conjunction with the set of distinct set point values, the load lines progressing from a lowest slope to a highest slope for successively higher ranges of the input voltage of the converter.

13. A switching power converter according to claim 12, wherein one or more of the load lines has a non-linear characteristic established by a corresponding set of set points at different values of the output voltage and output current, the set of set points being established by a calibration procedure and retrieved during use from a memory of the digital signal processor.

14. A switching power converter usable as one of a set of current sharing power converters, comprising:
  conversion circuitry having a switching power stage driving a converter output using power supplied at a converter input and based on a switching control input;
  interface circuitry configured to drive the switching control input of the conversion circuitry and to generate input voltage and output voltage sense signals, the switching control input being driven based on a power stage control signal, the input voltage and output voltage sense signals being generated based on an input voltage and an output voltage at the converter input and converter output respectively; and
  a digital signal processor operative to execute instructions to generate the power stage control signal in response to the input and output voltage sense signals, the instructions including instructions for performing a startup method including:
    initially performing a comparison calculation to determine whether the output voltage is substantially zero or is a non-zero pre-bias value by action of one or more other converters of the set;
    in a first case in which the output voltage is determined to be substantially zero, performing a soft-start startup by which a duty cycle of the power stage control signal is gradually increased from substantially zero to a normal operating duty cycle corresponding to a normal operating output voltage; and
    in a second case in which the output voltage is initially the non-zero pre-bias value, performing a pre-bias startup by which the duty cycle of the power stage control signal is gradually increased from an initial duty cycle to the normal operating duty cycle, the initial duty cycle being calculated by the digital signal processor as a predetermined ratio of the pre-bias value of the output voltage to the input voltage.

15. A switching power converter according to claim 14, wherein the startup method includes a current limiting function limiting the output current to no more than a predetermined maximum startup current.

16. A switching power converter, comprising:
  power conversion circuitry having an isolated switching power stage driving a converter output based on a secondary-side switching control input;
  interface circuitry configured to drive the secondary-side switching control input of the power conversion circuitry and to generate a stable reference signal and voltage and current sense signals, the secondary-side switching control input being driven based on a power stage control signal, the voltage and current sense signals being generated based on an output voltage and an output current respectively at the converter output; and
  a digital signal processor operative to execute instructions to perform a regulation method, the regulation method including:
    applying respective voltage and current scaling factors to the voltage and current sense signals to generate respective scaled voltage and current sense values;
    generating the power stage control signal with a duty cycle having a predetermined regulation relationship with the stable reference signal and the scaled voltage and current sense values;
    performing a calibration procedure to calculate the voltage and current scaling factors as values compensating for component tolerances in the interface circuitry and causing the power stage control signal to be generated to effect regulation of the output voltage and output current according to predetermined regulation relationship; and
    employing a set of distinct set point values each used for a respective distinct range of input voltage of the converter and establishing a corresponding distinct output voltage of the converter, the set point values chosen to control a duty cycle of the converter to be within a predetermined narrow range for relatively high efficiency operation over all the distinct ranges of input voltage of the converter.

17. A switching power converter according to claim 16, employing droop equalization of current sharing according to a droop load line, and wherein causing the power stage control signal is generated to effect regulation of the output voltage and output current according to the droop load line.

18. A switching power converter according to claim 17, wherein the regulation method further includes:
  employing a set of distinctly sloped load lines in conjunction with the set of distinct set point values, the load lines progressing from a lowest slope to a highest slope for successively higher ranges of the input voltage of the converter.

19. A switching power converter according to claim 18, wherein one or more of the load lines has a non-linear characteristic established by a corresponding set of set points at different values of the output voltage and output current, the set of set points being established by a calibration procedure and retrieved during use from a memory of the digital signal processor.

* * * * *